Sept. 17, 1968

A. J. GARVIN 3,401,498

METHOD AND APPARATUS FOR CAPPING CONTAINERS
OF UNSTABLE DIMENSIONS

Filed Sept. 30, 1965

*Inventor*

ALEX JAMES GARVIN by: *Cavanagh & Norman*

Sept. 17, 1968   A. J. GARVIN   3,401,498
METHOD AND APPARATUS FOR CAPPING CONTAINERS
OF UNSTABLE DIMENSIONS
Filed Sept. 30, 1965   2 Sheets-Sheet 2

*Inventor*
ALEX JAMES GARVIN
by: *Cavanagh & Norman*

United States Patent Office 3,401,498
Patented Sept. 17, 1968

3,401,498
METHOD AND APPARATUS FOR CAPPING CONTAINERS OF UNSTABLE DIMENSIONS
Alex James Garvin, Scarborough, Ontario, Canada, assignor to Superpack Vending (Curacao) N.V., Curacao, Netherlands Antilles
Continuation-in-part of application Ser. No. 229,898, Oct. 11, 1962. This application Sept. 30, 1965, Ser. No. 495,761
8 Claims. (Cl. 53—41)

ABSTRACT OF THE DISCLOSURE

Method and apparatus for capping tubular containers of flexible constitution by holding the container with one end exposed and applying a moldable film closure sheet over the exposed end of the container while flexing the latter inwardly. The film closure is applied to the container by application of heat and pressure on the closure in a mold recess, and the container is released which renders the film closure taut.

---

The invention relates to a method of capping containers of unstable dimensions such as cylindrical tubular cardboard containers and the like, and apparatus therefor.

The capping or closing of containers and packages utilizing automatic techniques is generally desirable for cost reduction purposes, particularly where such packages are of small unit size, for example vending machine packages. Furthermore, in his type of application it is essential that each package should conform as nearly as possible to a standard dimension and design in order to reduce rejects and to minimize feed failure in the vending machines. While some of these problems may have been overcome to a greater or lesser degree in particular instances of prior package design one of the principal factors limiting cap and closure techniques has been the variation or lack of stability in the dimensions of apparently uniform containers, due to variation in moisture content for example and other similar conditions, rendering the application of improved capping methods a difficult problem. Thus in prior packaging design the capping methods applied to a low cost packages of this type have caused a variety of problems such as the creation of a bulky or uneven and closure or cap rendering it difficult to achieve reliable feeding in a vending machine for example. Other such methods have involved an unacceptable number of operations, including handling, increasing the cost thereof. Further disadvantages have included poor sealing leading to deterioration and loss of the contents of the package, difficulty in opening the cap to obtain access to the contents, and other like problems have been exhibited in various circumstances.

Accordingly it is an objective of this invention to provide a method of capping containers of unstable dimensions which is efficient and reliable in use and which is economic and simple in operation and which results in a reliable container cap of a uniform, inconspicuous design.

More particularly it is an object of this invention to provide a method having the foregoing advantages which is particularly adapted to high speed automatic operation.

More particularly it is an object of this invention to provide a method having the foregoing advantages which is suitable for use with containers of cylindrical tubular cardboard material.

It is a further objective of the invention to provide apparatus for capping containers of unstable dimensions according to the said method.

The invention seeks to achieve the foregoing and other objectives which will become apparent from the following description of a preferred embodiment of the invention by the provision of a method of capping cylindrical tubular containers of unstable dimensions and comprising; applying a moldable film closure sheet over an end of said container with a portion thereof overlapping said container around said end; tensioning said closure sheet; applying heat and pressure to said overlapping portion of said closure sheet while maintaining said tension progressively folding the same around said end of said container and molding the same to adopt and conform to the contour of said container adjacent said end and to bond the same thereto forming a good liquid tight seal therewith; and subsequently permitting same to cool.

A preferred embodiment of the invention will now be described by way of example only with reference to the following drawings in which like reference devices refer to like parts thereof throughout the various views and diagrams and in which.

Figure 1:
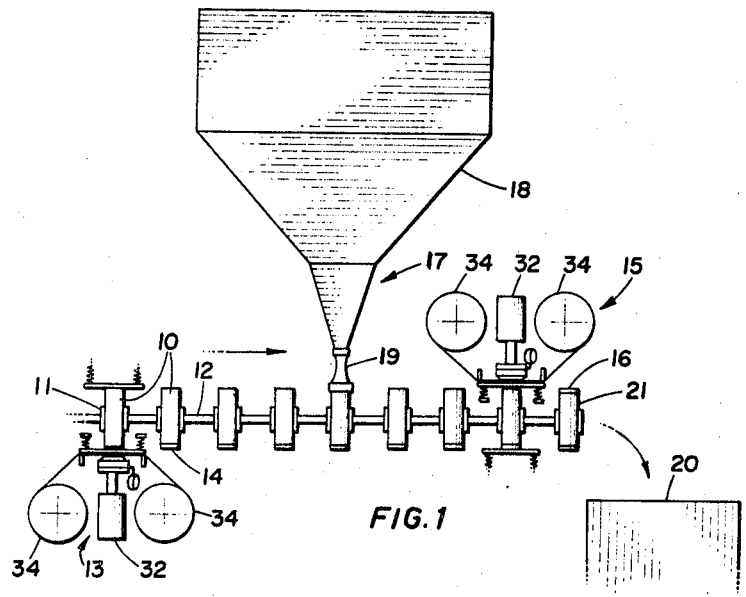
FIGURE 1 is a schematic illustration showing the location of the stages at which the instant capping method may be performed in a continous flow production line.

The illustration of FIGURE 1 discloses the general features of a flow production line for the manufacture of cylindrical tubular vending packages filled with any suitable wares such as powdered soap or other comminuted material.

In FIGURE 1 tubular containers 10 are supported intermediate their ends by clamps 11 movably mounted on belt 12 carrying containers 10 in intermittent motion. A first capping station 13 is provided beneath belt 12 for applying a lower cap 14 to container 10 and a second capping station 15, of similar design to station 13, is provided above belt 12 at a distance from station 13 for applying an upper cap 16 to container 10. Intermediate capping stations 13 and 15 the filling station 17 is provided which includes a hopper 18 for containing a supply of comminuted material for example, which is communicated to individual containers 10 by means of flexible conduit 19 engageable sequentially with each said container 10 as the same is moved by belt 12. Bin 20 is provided for collection of the completed vending packages 21 when released by clamps 11 by means (not shown). Since the operation of both capping stations 13 and 15 is the same station 15 is now described in detail it being understood that station 13 performs the same function in an opposed direction.

Figure 2:
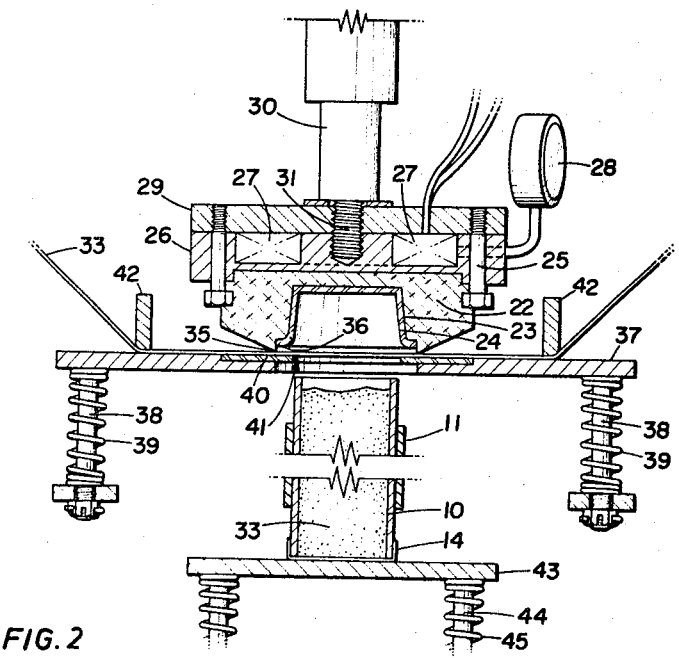
FIGURE 2 is an enlarged cross-sectional view of the apparatus for performing the capping operation according to the invention at an initial stage in its cycle.
Figure 3:
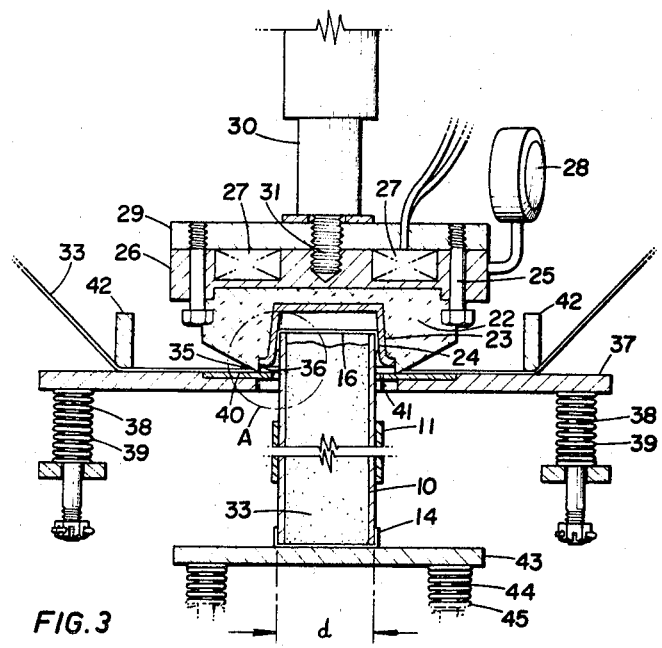
FIGURE 3 is an enlarged cross-sectional view corresponding to that of FIGURE 2 with the apparatus shown in a position corresponding to a final stage in its cycle.

From FIGURES 2 and 3 capping station 15 will be seen to comprise mold member 22 provided with mold recess 23 for reception of an end of a container 10 therein. Recess 23 is lined with synthetic liner wall 24 formed, in this preferred embodiment of heat-stable plastic material of any suitable type, and of a thickness insufficient to deteriously affect transfer of heat therethrough, shaped to provide a generally frusto-conical profile.

Bolts 25 engage either side of mold member 22 and provide a quick-release attachment securing the same to heating plate 26 for heating of mold member 22. Plate 26 is itself heated by electrical element 27 and is provided with temperature gauge 28 for control. Heating plate 26 is itself supported by backing plate 29 both of which are fastened to the end of shaft 30 by stud 31. Shaft 30 is reciprocated axially by any suitable power transmission means shown generally as 32 (see FIGURE 1). Cap forming material 33 of moldable, thermoplastic sheet stock is wound on drums 34 (see FIGURE 1) for storage and winding respectively, which are omitted from FIGURES 2 and 3 for clarity, driven by any suitable winding mechanism (not shown) to procure intermittent movement thereof in timed relation to the reciprocal movement of shaft 30. In order to cut a disc of material 33 for forming an individual cap 16 cutting die 35 is formed on the lower surface of mold member 22 being provided with an internal shoulder 36 for retaining the cut disc of material 33 in predetermined location therein. In this preferred embodiment shoulder 36 is formed by an integral portion of liner wall 24 to redue friction thereon. Material 33 is supported during cutting on a suitable cutting bed provided by plate 37 movably mounted on bolts 38 and urged upwardly by springs 39. In order to reduce friction and extend the life of cutting die 35 plate 37 is provided with wearing surface plate 40 formed of the same plastic as liner wall 24. Opening 41 is provided in plate 40 just large enough to permit the end of container 10 to pass therethrough but of lesser diameter than cutting die 35 to retain the disc of material 33 therewithin. Material 33 is clamped on plate 37 during cutting by means of clamps 42 formed of plastic material to reduce friction with material 33, clamps 42 being reciprocated vertically by any suitable mechanism (not shown) in timed relation with the movement of mold member 22.

In order to support container 10 during the capping operation support plate 43 is provided for the purpose, movably mounted on bolts 44 and urged upwardly by springs 45 thus permitting container 10 to move downwardly when the pressure of mold member 22 exceeds the upward force of springs 45.

The specific capping method according to this preferred embodiment of the invention comprises the following steps: A container 10 filled with material 33 is moved by clamps 11 into station 15 with its central axis directly in alignment with the axis of movement of mold member 22 and with its lower end resting on plate 43 the members being substantially in the position shown in FIGURE 2 at this point. Mold member 22 then begins its downward stroke under the influence of power transmission 32 and immediately die 35 is brought into contact with plastic capping material 33 and cuts out a disc thereof against surface plate 40 and then continues downwardly forcing plate 37 downwardly against springs 39, with opening 41 in plate 40 passing over the upper end of container 10.

The downward movement of die 35 carries with it the disc of material 33 located therewithin and sandwiched between shoulder 36 and surface plate 40. It will be noted that the disc of material 33 is of larger diameter than container 10 and that an annular portion thereof will overlap the sides of container 10, such portion corresponding substantially to the area thereof sandwiched as aforesaid. The disc of material 33 is thus brought into contact with the upper end of container 10 and with the centre thereof in alignment with the axis of container 10 and completely closing the same.

Figure 4:
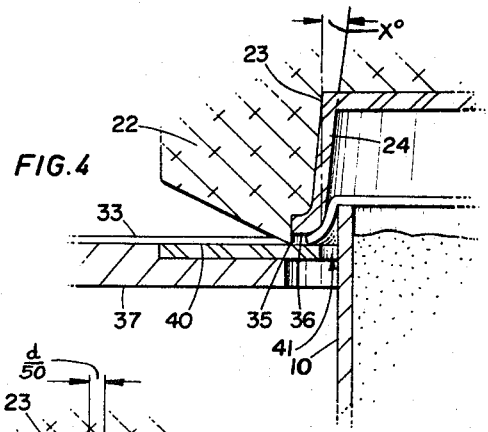
FIGURES 4 and 5 are greatly enlarged detail views of those members within the phantomed area A of FIGURE 3 showing two intermediate stages in the cycle of operations of the method according to the invention.

Continued downward movement of die 35 around container 10 causes the disc of material to become tensioned and stretched and such tensioning will increase as the annular portion of material 33 is drawn out of engagement with shoulder 36 and surface plate 40. By this stage in the cycle liner wall 24 will begin to engage container 10 squeezing material 33 therebetween and folding the annular portion thereof around container 10 and increasing the tensioning therein, the position of the members being substantially as shown in FIGURE 4. At the same time heat from element 27 will pass through mold member 22 and liner wall 24 into material 33 causing a limited plastic flow thereof and permitting the same to become molded smoothly around container 10 adopting and conforming to the contour thereof, any tendency for wrinkles or folds to occur therein being overcome by the flowing of the plastic into the new shape.

Figure 5:
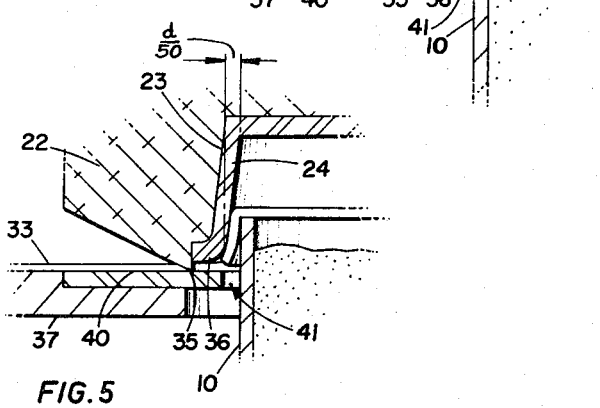

Completion of the downward movement will bring liner wall 24 further down over container 10, which due to the frusto-conical configuration thereof will increasingly constrict the upper end thereof which is unsupported against such pressure. The progressive build-up of pressure on container 10 will eventually overcome the upward bias of springs 45 and plate 43 will move downwardly thus limiting the pressure on container 10 to predetermined point below the point at which damage would be caused to container 10 or material 33. During this period the members will pass through the position shown in FIGURE 5 terminating in the position shown in FIGURE 3. The precise relation of liner wall 24 and container 10 will depend principally upon the diameter of container 10 causing either greater or lesser penetration therein. Inasmuch as a container 10 of cardboard may vary 2% or more in diameter and in length due to changes in moisture content for example, FIGURE 3 can only be taken as as approximate position since both the penetration and the movement of plate 43 will be subject to variation.

It will be understood that the shaping and dimensions of the liner wall 24 are closely related to and determined by reference to the diameter of the container 10 and the maximum variation in diameter encountered between different containers.

In the particular example shown the inclination of the walls from the true cylinder is about 2° and in any case should not be less than about 1° or greater than about 4° so as to ensure satisfactory molding of the plastic film in the plane of the container's walls. The diameter of the tubular containers is in the region of one and one-half inches and the depth of the tapered section of the mold is just under an inch. Obviously the taper of the mold must be in excess of the greatest variation of diameter $d$ of the container in this case about .015 of an inch and should therefore be not less than about 2% of the diameter $d$ where the diameter $d$ is liable to a variation of 1% so that the mold is given a taper of approximately one sixteenth of an inch which thereby determines its depth.

Thus the relationship may be summarized that given a diameter $d$ of the container and a variation in $d$ between containers of up to $d/100$ then the mold should taper about $d/50$ and have a wall inclination of an angle $x$ of between 1° and 4°. Where the maximum variation between containers is some other fraction $f$ of $d$ then the mold should taper more than $f$ but retain the same wall angle $x$ thereby determining the required depth of the mold recess.

On completion of the downward stroke a momentary dwell period may be utilized to ensure complete penetration of heat through material 33, particularly where, for example, container 10 is coated with a like plastic material and it is required to procure a bond therewith by heat sealing thereof.

Thereafter power transmission 32 raises mold member 22 upwardly drawing liner wall 24 away from container 10 which is still held by clamps 11 at this point. Material 33 will then cool and set rapidly and cap 16 is completed. Removal of liner wall 24 from container 10 will release container 10 from constriction and permit the same to flex outwardly to a limited extent thus increasing the tension in cap 16. As mold member 22 reaches its upper position once more clamps 42 are momentarily released and drums 34 rotate moving a fresh piece of material 33 beneath die 35 for cutting thereof on the next cycle of operation.

Simultaneously with the movement of material 33 belt 12 will move clamps 11 thus removing the completed package 21 and moving a new container 10 into registration with mold member 22.

It will be noted that the above operation will accommodate relatively substantial variations in the size of container 10 without loss of efficiency or economy, even where such variations occur at random intervals. Furthermore the caps 14 and 16 resulting from the said method effect an efficient liquid and airtight sealing of container 10 while also forming integral end closures for container 10 forming the same into the complete package 21 thus economizing in container material and also providing for easy opening thereof by merely puncturing a cap 14 or 16. The utility of the package 21 is also increased by the smooth, wrinkle-free exterior surface of caps 14 and 16 which permits the use of such packages in vending machines, with a minimum of servicing.

This application is a continuation-in-part of my co-pending application Ser. No. 229,898 filed Oct. 11, 1962 for Method and Apparatus for Capping Containers of Unstable Dimensions.

The foregoing is a description of a preferred embodiment of the invention by way of example only and the invention is not limited to the specific features shown but contemplates all such variations as come within the spirit of the invention as defined by the following claims.

What I claim is:

1. The method of capping cylindrical tubular containers of unstable dimensions unsupported at at least one end thereof and permitting limited flexibility and comprising: applying a moldable film closure sheet over an end of said container with a portion thereof overlapping said container around said end; applying heat and pressure to said overlapping portion of said closure sheet in an area of said container unsupported against said pressure around said end thereof, said pressure causing deformation and constriction of said container in said area; progressively continuing said heat and pressure to mold said overlapping portion of said sheet and cause it to adopt and conform to the contour of said container in said area and to bond the same thereto forming a good liquid tight seal therewith; and subsequently removing said heat and pressure and permitting said area of said container to flex outwardly and tension said sheet across said end.

2. The method of capping cylindrical tubular containers of unstable dimensions unsupported at at least one end thereof and permitting limited flexibility and comprising: cutting a disc of thermoplastic capping sheet material of a diameter in excess of the maximum diameter of said container; registering said disc in alignment with the axis of said container and in contact with an end thereof, the circumference of said disc defining an annular overlapping portion therearound; causing axial movement of said end of said container relative to a mold member of generally frusto-conical shape fitting progressively closer around said end of said containers and pressing said overlapping annular portion of said disc into close contact with said container over and around said end; said pressure causing limited inward flexing of said end; terminating said relative axial movement when said pressure reaches a predetermined maximum value for said container below that sufficient to damage said end of said container; simultaneously applying heat to said overlapping portion of said disc causing the same to flow and adopt the contour of said end of said container and form a good liquid tight seal therewith; and subsequently withdrawing said container from said mold member.

3. Apparatus for capping containers of unstable dimensions and comprising: container support means operable to move said container sequentially into and out of a capping station; means for supporting moldable thermoplastic capping sheet material movably located in registration with an open end of a said container in said station; sheet cutting means operable to cut a portion of said sheet, the shape of said cut portion being similar to that of said open end and large enough to overlap a portion of said container therearound; molding means defining a mold recess of frusto-conical shape tapering inwardly from an open mouth to accommodate containers of varying dimensions and operable to apply heat and pressure to said cut portion of said sheet and said container to form the same into a cap around said open end of said container; and pressure regulating means for controlling the pressure applied to said sheet and said container during forming as aforesaid.

4. Apparatus for capping containers of unstable dimension as claimed in claim 5 wherein said container is of cylindrical shape having an average diameter of $d$ and including stop means within said sheet cutting means retaining said cut portion of said sheet therewithin, and being dimensioned and oriented to fit around said open end of said container and permit the same to pass therethrough; and wherein said mold recess tapers inwardly at an angle of between about 1 degree and 4 degrees, and preferably about 2 degrees and wherein the minimum diameter and maximum diameter of said mold recess vary by between about 2 percent and 4 percent and an intermediate diameter of $d$.

5. Apparatus for capping containers of unstable dimensions as claimed in claim 5 wherein said container is of cylindrical shape having an average diameter of $d$ and including a bed portion supporting said sheet material in registration with said die member for cutting as aforesaid and having an opening therein sufficient for said container end to pass therethrough; and wherein said mold recess tapers inwardly at an angle of between about 1 degree and 4 degrees, and preferably about 2 degrees and wherein the minimum diameter and maximum diameter of said mold recess vary by between about 2 percent and 4 percent and an intermediate diameter of $d$.

6. Apparatus for capping containers of unstable dimensions as claimed in claim 3 wherein said container is of cylindrical shape having an average diameter of $d$ and including clamping means operable to momentarily engage and clamp said sheet during cutting as aforesaid; and wherein said mold recess tapers inwardly at an angle of between about 1 degree and 4 degrees, and preferably about 2 degrees and wherein the minimum diameter and maximum diameter of said mold recess vary by between about 2 percent and 4 percent and an intermediate diameter of $d$.

7. Apparatus for capping containers of unstable dimensions as claimed in claim 3 wherein said container is of cylindrical shape having an average diameter of $d$ and including said molding means having a mold recess defined by interior wall portions dimensioned and oriented to fit over and closely engage said container around its said open end and being of frusto-conical shape tapering inwardly from an open mouth to accommodate containers of varying dimensions and wherein said mold recess tapers inwardly at an angle of between about 1 degree and 4 degrees, and preferably about 2 degrees and wherein the minimum diameter and maximum diameter of said mold recess vary by between about 2 percent and 4 percent and an intermediate diameter of $d$.

8. Apparatus for capping containers of unstable dimensions as claimed in claim 3 wherein said container is of cylindrical shape having an average diameter of $d$ and wherein said mold recess tapers inwardly at an angle of between about 1 degree and 4 degrees, and preferably about 2 degrees and wherein the minimum diameter and maximum diameter of said mold recess vary by between about 2 percent and 4 percent and an intermediate diameter of $d$; pressure means operable to force said mold member towards said container with said recess over said open end of said container, said interior wall portions applying pressure to said cut portion of said sheet and said forming the same and simultaneously progressively constricting said open end of said container therearound; and means for heating said mold member to a predetermined temperature range sufficient to cause said sheet material to flow and bond with said container during the application of pressure thereto as aforesaid.

References Cited

UNITED STATES PATENTS 2,075,727  3/1937  Karlsson et al. _____ 53—297
2,263,152  11/1941  Wilcox _____ 53—39 X WILLIAM W. DYER, Jr., *Primary Examiner.*

R. L. FARRIS, *Assistant Examiner.*